United States Patent
Hu et al.

(10) Patent No.: US 12,514,817 B2
(45) Date of Patent: Jan. 6, 2026

(54) PREPARATION METHOD FOR NUTRITIONAL GUMMIES CONTAINING HIGH-LOADING LIQUID CAPSULES

(71) Applicant: Ningbo Jildan Health Science and Technology Co., Ltd, Zhejiang (CN)

(72) Inventors: Xiaofeng Hu, Zhejiang (CN); Dan Qiu, Zhejiang (CN); Qiuxia Qian, Zhejiang (CN); Xiaohui Lu, Zhejiang (CN); Lei Chen, Zhejiang (CN); Mingxia Li, Zhejiang (CN); Yingke Chen, Zhejiang (CN)

(73) Assignee: Ningbo Jildan Health Science and Technology Co., Ltd, Ningbo (CN)

( * ) Notice: Subject to any disclaimer, the term of this patent is extended or adjusted under 35 U.S.C. 154(b) by 30 days.

(21) Appl. No.: 18/433,514

(22) Filed: Feb. 6, 2024

(65) Prior Publication Data
US 2025/0025413 A1 Jan. 23, 2025

(30) Foreign Application Priority Data
Jul. 20, 2023 (CN) .......................... 202310899908.X

(51) Int. Cl.
| | | |
|---|---|---|
| *A61K 9/48* | (2006.01) | |
| *A61K 9/00* | (2006.01) | |
| *A61K 31/375* | (2006.01) | |
| *A61K 35/742* | (2015.01) | |

(52) U.S. Cl.
CPC .......... *A61K 9/0056* (2013.01); *A61K 9/4808* (2013.01); *A61K 9/4825* (2013.01); *A61K 9/4833* (2013.01); *A61K 9/4866* (2013.01); *A61K 31/375* (2013.01); *A61K 35/742* (2013.01)

(58) Field of Classification Search
CPC ...... A61K 9/48; A61K 9/4816; A61K 9/4808; A61K 9/4833; A61K 9/4841; A61K 9/4891
See application file for complete search history.

(56) References Cited

U.S. PATENT DOCUMENTS

| | | | | |
|---|---|---|---|---|
| 4,935,243 A | * | 6/1990 | Borkan | ................ A61K 9/4858 424/455 |
| 5,817,323 A | | 10/1998 | Hutchinson et al. | |

FOREIGN PATENT DOCUMENTS

| | | | | |
|---|---|---|---|---|
| CN | 106880046 A | | 6/2017 | |
| CN | 110478312 A | | 11/2019 | |
| CN | 111803439 A | | 10/2020 | |
| CN | 115812824 A | | 3/2023 | |
| EP | 3332774 A1 | * | 6/2018 | ............. A61K 36/45 |
| WO | WO-2016164464 A1 | * | 10/2016 | ............... A23G 3/36 |

OTHER PUBLICATIONS

Feng Guo, Development of Lactobacillus plantarum powder and its soft capsules, Full-text Database of China Excellent Masters Dissertation Engineering Technology Series I, Aug. 15, 2014, pp. 35-40.
Notice of Allowance of counterpart Chinese Patent Application No. 202310899908.X issued on Jul. 12, 2024.
First Office Action of counterpart Chinese Patent Application No. 202310899908.X issued on Apr. 19, 2024.
First Search Report of counterpart Chinese Patent Application No. 202310899908.X issued on Apr. 16, 2024.
Supplementary Search Report of counterpart Chinese Patent Application No. 202310899908.X issued on Jun. 15, 2024.

* cited by examiner

*Primary Examiner* — Micah Paul Young

(57) ABSTRACT

The present disclosure provides a preparation method for liquid capsules and its application in nutritional gummies, belonging to the technical field of food processing. The preparation method for the liquid capsules provided by the present disclosure is as follows: hydrocolloid, a solvent and colorant are used to prepare a wall material, a functional substance, an additive and a dispersant are used to prepare a core material, the wall material is processed into capsule shell, and the core material is encapsulated in the capsule shell and then dried to obtain the liquid capsules. The present disclosure obtains the liquid capsules with good formability by adjusting and controlling the composition and ratio of the wall materials and core materials, which enables the liquid capsules to be effectively added to gummies syrup, thereby obtaining high-quality nutritional gummies with good stability.

7 Claims, 1 Drawing Sheet

PREPARATION METHOD FOR NUTRITIONAL GUMMIES CONTAINING HIGH-LOADING LIQUID CAPSULES

CROSS-REFERENCE TO RELATED APPLICATION

The present application claims priority from Chinese Patent Application No. 202310899908.X filed on Jul. 20, 2023, the contents of which are incorporated herein by reference in their entirety.

TECHNICAL FIELD

The present disclosure belongs to the technical field of food processing, and specifically relates to a preparation method for nutritional gummies containing high-loading liquid capsules.

BACKGROUND

Nutritional gummies are generally made from raw materials such as gelatin and syrup, with common functional factors added as needed, and processed through multiple processes. However, the production process of gummies generally requires processing in a high-temperature water environment. Unstable functional factors such as vitamin C, vitamin E, and fish oil will undergo significant side reactions at this stage, seriously affecting the quality and taste of gummies.

Liquid capsules refer to a dosage form in which liquid functional substances are encapsulated in different capsules, including but not limited to softgel, dripping pills, drops, etc. Currently, liquid capsules have been widely applied in medicine, food, cosmetics, and other fields. Liquid capsules are generally composed of wall materials and core materials, and material selection and preparation process have a great impact on the performance of the capsules. As for wall materials, gelatin is widely used as a traditional softgel wall material due to its good biocompatibility and biodegradability. However, using gelatin alone as a wall material still needs to be improved in terms of formability and loading capacity, and its quality and taste cannot meet the requirements. At present, the more mature method is to prepare capsules by compounding gelatin with other edible polysaccharide colloids, starch, or modified starch.

Chinese patent CN111803439A discloses a chewable and edible oil-in-water gel composition and its preparation method and use, with any one or more of gelatin, carageenan, pectin, konjac gum and guar gum as a first gelling agent, and any one or more of xanthan gum, agar, gellan gum, carob bean gum, arabic gum and modified starch as a second gelling agent, which significantly improves the oil content and stability of the oil gel product, and improves product flavor.

Chinese patent CN110478312A discloses a stable gel composition with high oil content and its preparation method and use, with any one or more of gelatin, carageenan, pectin, konjac gum and guar gum as a first gelling agent, and any one or more of xanthan gum, agar, gellan gum, carob bean gum, and arabic gum as a second gelling agent, thus achieving the effects of improving oil stability and perfecting the structure of the composition.

Based on the many technical challenges faced by nutritional gummies, by adding liquid capsules to nutritional gummies, the decline in quality and taste caused by side reactions of unstable functional substances during the preparation of the gummies can be avoided, thereby significantly improving the quality and efficacy of the nutritional gummies. At present, the preparation process of nutritional gummies containing liquid capsules is not mature, so it is necessary to provide a new preparation method for liquid capsules and further apply the prepared liquid capsules to the nutritional gummies, so as to improve the quality of the nutritional gummies.

SUMMARY

The object of the present disclosure is to provide a preparation method for liquid capsules in view of the shortcomings of the prior art. The liquid capsules with good formability are obtained by adjusting and controlling the composition and ratio of wall materials and core materials, which enables the liquid capsules to be effectively added to gummies syrup, thereby obtaining high-quality nutritional gummies with good stability.

In order to achieve the above object, the specific technical solutions of the present disclosure are as follows:

According to the first aspect of the present disclosure, provided is a preparation method for liquid capsules, including the following steps:

step (1), mixing hydrocolloid, a solvent, and colorant for dissolving, performing vacuum treatment, and standing still to obtain a wall material;

step (2), dispersing a functional substance and an additive in a dispersant to obtain a core material; and step (3), processing the wall material obtained in step (1) into capsule shell, encapsulating the core material obtained in step (2) in the capsule shell, and drying to obtain the liquid capsules.

Further, in step (1), the hydrocolloid is any one or a mixture of several selected from the group consisting of gelatin, starch acetate, carboxymethyl cellulose, carageenan, and pectin; preferably, the hydrocolloid is a mixture of gelatin and starch acetate, with a mixed mass ratio being (2-3):1; and more preferably, the mixed mass ratio of the gelatin to the starch acetate is (2.5-3):1.

Further, in step (1), the colorant is added according to the desired color, and can be selected from one or more edible colorants: lycopene, monascus red, gardenia yellow, turmeric, theaflavins, sunset yellow t, tartrazine, brilliant blue, and allura red.

Further, in step (1), dissolving is carried out at the temperature of 60-105° C., the vacuum treatment is performed at the temperature of 60-105° C. under the pressure of −0.6 to −0.9 MPa, the standing temperature is 50-100° C., and the standing time is 1-2 h; and preferably, dissolving is carried out at the temperature of 70-95° C., the vacuum treatment is performed at the temperature of 70-95° C. under the pressure of −0.8 to −0.9 MPa, the standing temperature is 70-90° C., and the standing time is 1.5-2 h.

Further, in step (1), the solvent is a mixture of water and glycerol, and the mass ratio of the water to the glycerol is 1:(0.2-1); and preferably, the mass ratio of the water to the glycerol is 1:(0.3-0.65).

Further, in step (2), the functional substance is any one or a mixture of several selected from the group consisting of fat-soluble vitamins, water-soluble vitamins, carotenoids, minerals, sodium hyaluronate, probiotic powder, natural product extracts, algae oil, fish oil, natural oil, and DHA; and preferably, the functional substance is any one of water-soluble vitamins and DHA.

Further, in step (2), the additive is a mixture of polyethylene glycol, beeswax, and phospholipid, and the mixed mass ratio of the polyethylene glycol, the beeswax and the phospholipid is 1:(0.2-0.35):(0.1-0.25); and preferably, the mass ratio of the polyethylene glycol, the beeswax and the phospholipid is 1:(0.2-0.3):(0.1-0.18).

Further, the molecular weight of the polyethylene glycol is 200-800; and preferably, the molecular weight of the polyethylene glycol is 400 or 600.

Further, in step (2), the dispersant is any one or a mixture of several selected from the group consisting of algae oil, fish oil, and natural oil; and more preferably, the dispersant is any one of algae oil, fish oil, and soybean oil.

Further, in step (2), in the dispersion process, the temperature is 25-70° C., the rotation speed is 500-3000 rpm, and the time is 0.5-1 h; and preferably, in the dispersion process, the temperature is 45-70° C., the rotation speed is 1000-2000 rpm, and the time is 0.5-1 h.

Further, the mass ratio of the wall material to the core material is (15-52):(48-85); and preferably, the mass ratio of the wall material to the core material is (25-40):(60-75).

Further, in step (3), the drying temperature is 15-30° C., and the drying time is 8-48 h; and preferably, the drying temperature is 20-30° C., and the drying time is 24-48 h.

Further, in step (3), the liquid capsules are dried until having a water content of 6-20%; and preferably, the liquid capsules are dried until having a water content of 10-16%.

Further, in step (3), the dosage forms of the liquid capsules include, but are not limited to, softgel, dripping pills, and drops.

According to the second aspect of the present disclosure, provided are liquid capsules, which are prepared by the above method;

the liquid capsules are prepared from the following components in parts by weight:
materials for preparing a package material: 15-80 parts of hydrocolloid, 0-0.5 parts of colorant, and 20-120 parts of a solvent; and
materials for preparing a core material: 100-170 parts of a functional substance, 0-20 parts of an additive, and 0-200 parts of a dispersant.

Further, the liquid capsules are prepared from the following components in parts by weight:
materials for preparing a package material: 30-68 parts of hydrocolloid and 60-100 parts of a solvent; and
materials for preparing a core material: 120-150 parts of a functional substance, 10-20 parts of an additive, and 100-200 parts of a dispersant.

According to the third aspect of the present disclosure, provided is application of the above-mentioned liquid capsules in the preparation of nutritional gummies.

According to the fourth aspect of the present disclosure, provided are nutritional gummies containing liquid capsules, which contain the liquid capsules, a gummies material and a blended solution, a wall material of the liquid capsules is prepared from hydrocolloid, colorant and a solvent, and a core material of the liquid capsules is prepared from a functional substance, an additive, and a dispersant, where
the hydrocolloid is any one or a mixture of several selected from the group consisting of gelatin, starch acetate, carboxymethyl cellulose, carrageenan, and pectin;
the solvent is water, glycerol, and a mixture thereof;
the additive is a substance that helps the core material to be uniformly and stably dispersed;
the dispersant is a substance that disperses the core material;
the functional substance is any one or a mixture of several selected from the group consisting of fat-soluble vitamins, water-soluble vitamins, carotenoids, minerals, sodium hyaluronate, probiotic powder, natural product extracts, algae oil, fish oil, natural oil, and DHA;
the gummies material is any one or a mixture of several selected from the group consisting of sugar, glucose, maltitol, maltitol syrup, sorbitol syrup, erythritol, isomaltitol, maltose syrup, cassava syrup, starch acetate, gelatin, pectin, carrageenan, arabic gum, gellan gum, oligofructose, polyglucose, agar, sodium alginate, fruit and vegetable juice, and functional substances; and
the blended solution includes fruit juice, flavor, colorant, an acidity regulator, and functional substances.

Further, the fruit juice includes but is not limited to any one or a mixture of several selected from the group consisting of apple juice, grape juice, blueberry juice, orange juice, and citrus juice; the flavor includes but is not limited to any one or a mixture of several selected from the group consisting of orange flavor, strawberry flavor, apple flavor, blueberry flavor, or pineapple flavor; the color of the colorant matches that of the flavor, for example, sunset yellow colorant is employed when in use of orange flavor, and the colorant is prepared into a solution with a mass fraction of 1-5% in advance before addition; the acidity regulator includes but is not limited to any one or a mixture of several selected from the group consisting of citric acid, lactic acid, malic acid, phosphoric acid, sodium citrate, and tartaric acid, and the acidity regulator is prepared into a solution with a mass fraction of 10-50% in advance before addition; and the functional substance includes but is not limited to any one or a mixture of several selected from the group consisting of fat-soluble vitamins, water-soluble vitamins, carotenoids, minerals, sodium hyaluronate, probiotic powder, natural product extracts, algae oil, fish oil, natural oil, and DHA.

Further, based on 100 parts of the gummies material, the addition amounts of all the components in the blended solution are: 0-10 parts of the fruit juice, 0-1 parts of the flavor, 0-0.01 parts of the colorant, 0-1.5 parts of the acidity regulator, and 0-13 parts of the functional substance. Preferably, based on 100 parts of the gummies material, the addition amounts of all the components in the blended solution are: 3-6 parts of the fruit juice, 0.1-0.5 parts of the flavor, 0-0.01 parts of the colorant, 0.5-1 parts of the acidity regulator, and 3-18 parts of the functional substance.

Further, in the nutritional gummies containing liquid capsules, the mass ratio of the gummies material, the liquid capsules and the blended solution is 100:(5-47):(0-25); and preferably, the mass ratio of the gummies material, the liquid capsules and the blended solution is 100:(10-30):(5-10).

Further, the nutritional gummies containing liquid capsules include the liquid capsules, maltose syrup, glucose syrup, sugar, maltitol, sorbitol syrup, maltitol syrup, gelatin, starch acetate, pectin, agar, and a blended solution.

Further, the nutritional gummies containing liquid capsules include the following components in parts by weight: 5-30 parts of the liquid capsules, 30-50 parts of maltose syrup, 25-35 parts of sugar, 2-5 parts of sorbitol syrup, 5-10 parts of gelatin, 0.5-5 parts of starch acetate, 0.1-0.5 parts of pectin, 0.2-0.5 parts of agar, and 0-25 parts of a blended solution.

Preferably, the nutritional gummies containing liquid capsules include the following components in parts by weight: 10-24 parts of the liquid capsules, 35-45 parts of maltose syrup, 25-30 parts of sugar, 3-4 parts of sorbitol syrup, 8-10 parts of gelatin, 2-3 parts of starch acetate, 0.3-0.5 parts of pectin, 0.2-0.4 parts of agar, and 5-15 parts of a blended solution.

Further, the nutritional gummies containing liquid capsules include the following components in parts by weight: 5-30 parts of the liquid capsules, 50-70 parts of maltitol syrup, 7-15 parts of maltitol, 5-10 parts of gelatin, 0.5-5 parts of starch acetate, 0.1-0.5 parts of pectin, 0.2-0.5 parts of agar, and 0-25 parts of a blended solution.

Preferably, the nutritional gummies containing liquid capsules include the following components in parts by weight: 10-20 parts of the liquid capsules, 55-65 parts of maltitol syrup, 10-12 parts of maltitol, 8-10 parts of gelatin, 3-5 parts of starch acetate, 0.3-0.5 parts of pectin, 0.3-0.5 parts of agar, and 8-15 parts of a blended solution.

According to the fifth aspect of the present disclosure, provided is a preparation method for nutritional gummies containing liquid capsules, which includes the following steps:

S1. dissolving a gummies material in water, and boiling under the vacuum condition until the solid concentration is 60-85%, so as to obtain initial syrup;

S2. mixing the initial syrup obtained in S1 with a blended solution to obtain pouring syrup, and keeping same warm for later use; and S3. adding the pouring syrup obtained in S2 and the liquid capsules into molds for molding to obtain the nutritional gummies.

Further, in step S1, the solid concentration is 50-70% after the gummies material is dissolved in water; and preferably, the solid concentration is 50-60% after the gummies material is dissolved in water.

Further, in step S1, the vacuum degree is −0.5 to −0.6 bar during boiling under the vacuum condition; and preferably, the vacuum degree is −0.53 to −0.57 bar during boiling under the vacuum condition.

Further, in step S2, the solid concentration of the pouring syrup is 70-85%; and preferably, the solid concentration of the pouring syrup is 75-80%.

Further, in step (2), the temperature is kept at 50-60° C.; and preferably, the temperature is kept at 55-60° C.

Further, in step S3, after the molding, the method further includes the steps of cooling, demoulding, sugar addition, and drying. Preferably, in step S3, the cooling temperature is 0-8° C.; and more preferably, the cooling temperature is 0-4° C.

Further, in step S3, adding the pouring syrup and the liquid capsules into molds includes: adding all the pouring syrup into the molds first, and then adding the liquid capsules.

Further, in step S3, adding the pouring syrup and the liquid capsules into molds includes: first adding 10-30% by mass of the total pouring syrup into the molds, then adding the liquid capsules thereinto, and finally adding the remaining pouring syrup.

Compared with the prior art, the present disclosure has the following beneficial effects:

(1) The present disclosure provides the preparation method for the liquid capsules. By adjusting and controlling the composition, ratio, and content of the wall materials and core materials, the prepared liquid capsules can be effectively added to gummies syrup, thereby obtaining high-quality nutritional gummies with good stability.

(2) According to the preparation method of the liquid capsules provided by the present disclosure, gelatin and starch acetate are used as the wall material, which can improve the formability of the liquid capsules and significantly improve the stability thereof in the nutritional gummies; and the beeswax, the phospholipid and the polyethylene glycol are added to the core material, which can adjust the density and shape of the core material and help the liquid capsules to be effectively dispersed in the nutritional gummies syrup, thereby significantly improving the quality and stability of the nutritional gummies.

DETAILED DESCRIPTION

The following non-limiting examples may enable those of ordinary skill in the art to understand the present disclosure more comprehensively, but do not limit the present disclosure in any way. The following content is only an exemplary description of the protection scope claimed by the present disclosure, and those skilled in the art can make various changes and modifications to the present disclosure based on the disclosed content, which shall also fall within the protection scope claimed by the present disclosure.

The present disclosure will be further described below in the form of specific examples. Various chemical reagents used in the examples of the present disclosure were obtained through conventional commercial channels unless otherwise specified.

Example 1

Liquid capsules included a wall material and a core material, where the wall material was prepared from: 4.4 g of gelatin, 1.6 g of starch acetate, 6 g of water, 3 g of glycerol, and 0.002 g of allura red; and the core material was prepared from: 12 g of vitamin C, 1 g of polyethylene glycol (having a molecular weight of 400), 0.25 g of beeswax, 0.15 g of phospholipid, and 20 g of soybean oil.

A preparation method of the above-mentioned liquid capsules included the following steps:

step (1), the materials for preparing the wall material were mixed together and heated at 70° C. for dissolving, the obtained solution was subjected to vacuum treat under −0.8 MPa, and the product stood still for 2 h at 70° C. to obtain the wall material for later use;

step (2), the materials for preparing the core material were mixed together at 60° C. and dispersed at 2000 rpm for 0.5 h to obtain the core material for later use; and step (3), the wall material obtained in step (1) was processed into capsule shell, the core material obtained in step (2) was encapsulated in the capsule shell, and the product was pressed for molding and dried until having a moisture content of 14% so as to obtain the liquid capsules.

Figure 1:
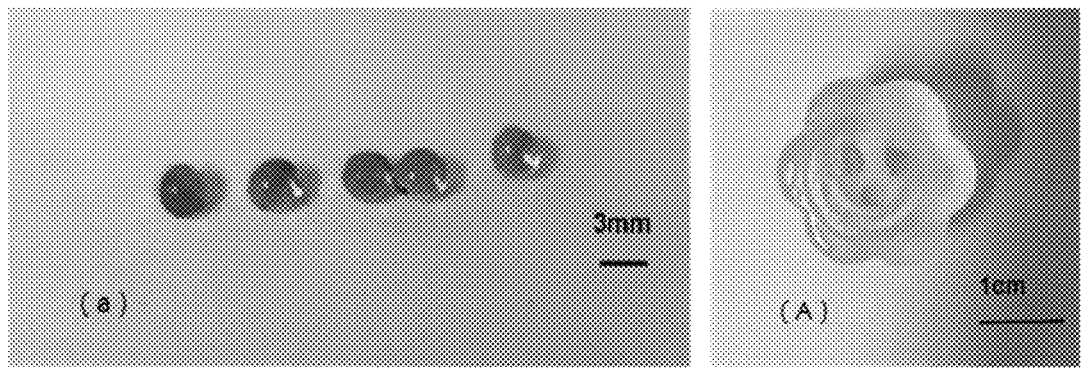
FIG. 1 is a physical diagram of liquid capsules and corresponding nutritional gummies provided in Example 1 of the present disclosure; in the figure, (a) shows the liquid capsules, and (A) shows the nutritional gummies.

This example further provides nutritional gummies containing liquid capsules, prepared by the following method:

S1. a gummies material was dissolved in water, and specifically, 40 g of maltose syrup, 25 g of sugar, 3 g of sorbitol syrup, 8 g of gelatin, 3 g of starch acetate, 0.3 g of pectin and 0.3 g of agar were dissolved in purified water; vacuum cycle boiling was carried out at the vacuum degree of −0.55 bar until the solid concentration was 75%, so as to obtain initial syrup; the initial syrup was kept warm at 55° C. for later use;

S2. 4 g of concentrated orange juice, 5 g of sodium hyaluronate, 0.2 g of orange flavor, 0.5 parts of a citric acid solution (50% by mass), and 0.2 g of a buffered lactic acid solution (50% by mass) were mixed well to obtain pouring syrup, and the pouring syrup was kept warm for later use; and S3. 20% by mass of the total pouring syrup was added into all molds, then 20 g of liquid capsules were injected into all the molds in an amount of 3 capsules per mold through a pipeline with a specific aperture, the remaining pouring syrup was finally added, and the product was cooled at 0° C., demoulded, subjected to sugar addition, and dried until having a water content of 16% to obtain the nutritional gummies. The liquid capsules obtained in this example had diameters of about 2.6 mm and capsule shell thicknesses of about 0.45 mm. In this example, the physical diagram of the liquid capsules and the corresponding nutritional gummies obtained by using molds of different sizes is shown in FIG. 1.

Example 2

The difference from Example 1 was that a gummies material was prepared from 60 g of maltitol syrup, 12 g of maltitol, 9 g of gelatin, 4 g of starch acetate, 0.4 g of pectin, and 0.5 g of agar.

Example 3

Figure 2:
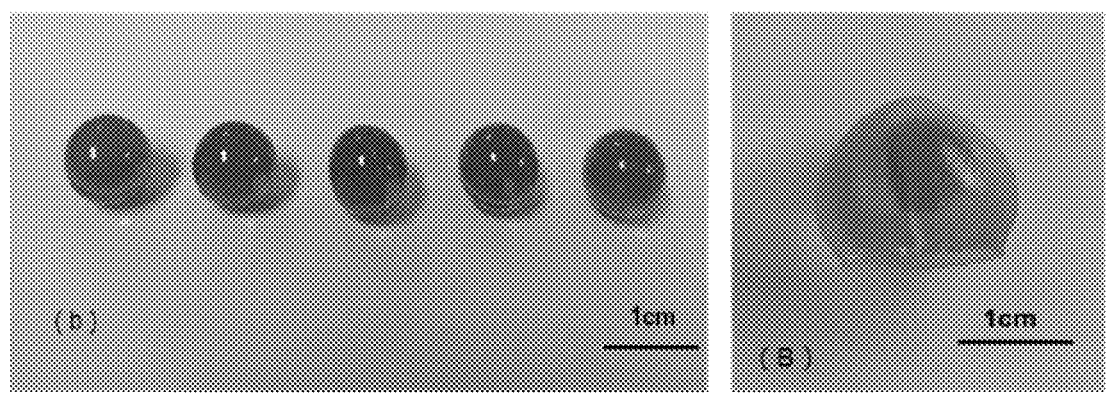
FIG. 2 is a physical diagram of liquid capsules and corresponding nutritional gummies provided in Example 3 of the present disclosure; in the figure, (b) shows the liquid capsules, and (B) shows the nutritional gummies.

The differences from Example 1 were that an equal amount of DHA was used instead of vitamin C; and the step of adding pouring syrup and liquid capsules into molds included: 20% by mass of the total pouring syrup was added into all the molds, then 20 g of the liquid capsules were injected into all the molds in an amount of 1 capsule per mold through a pipeline with a specific aperture, the remaining pouring syrup was finally added, and the product was cooled at 0° C., demoulded, subjected to sugar addition, and dried until having a water content of 16% to obtain nutritional gummies. The liquid capsules obtained in this example had diameters of about 8.51 mm and capsule shell thicknesses of about 0.40 mm. In this example, the physical diagram of the liquid capsules and the corresponding nutritional gummies obtained by using molds of different sizes is shown in FIG. 2.

Example 4

Figure 3:
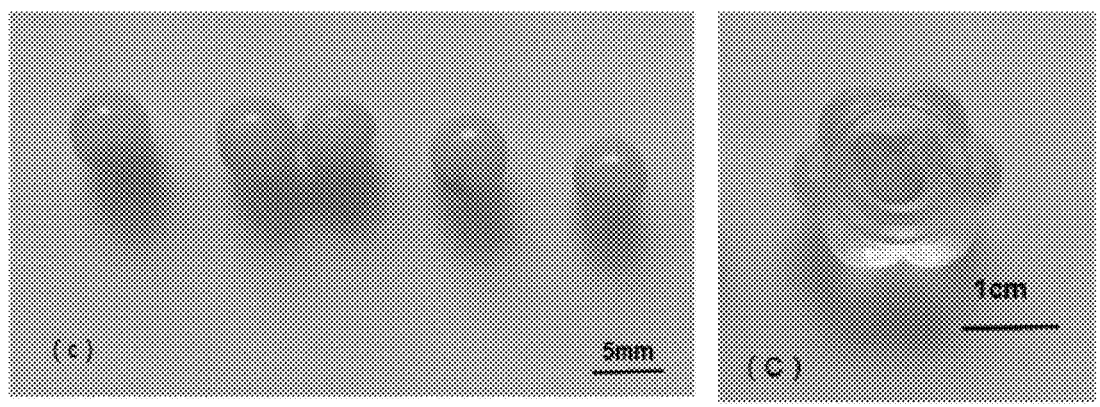
FIG. 3 is a physical diagram of liquid capsules and corresponding nutritional gummies provided in Example 4 of the present disclosure; in the figure, (c) shows the liquid capsules, and (C) shows the nutritional gummies.

The differences from Example 1 were that 0.001 g of bright blue and 0.004 g of tartrazine were used instead of 0.002 g of allura red as materials for preparing a wall material of liquid capsules; an equal amount of probiotics was used instead of vitamin C; and the step of adding pouring syrup and liquid capsules into molds included: 20% by mass of the total pouring syrup was added into all the molds, then 20 g of the liquid capsules were injected into all the molds in an amount of 1 capsule per mold through a pipeline with a specific aperture, the remaining pouring syrup was finally added, and the product was cooled at 0° C., demoulded, subjected to sugar addition, and dried until having a water content of 16% to obtain nutritional gummies. The liquid capsules obtained in this example had diameters of about 4.48 mm and capsule shell thicknesses of about 0.36 mm. In this example, the physical diagram of the liquid capsules and the corresponding nutritional gummies obtained by using molds of different sizes is shown in FIG. 3.

Example 5

The difference from Example 1 was that materials for preparing a wall material included: 4 g of gelatin, 2 g of starch acetate, 6 g of water, and 3 g of glycerol.

Example 6

The difference from Example 1 was that materials for preparing a wall material included: 4.5 g of gelatin, 1.5 g of starch acetate, 6 g of water, and 3 g of glycerol.

Example 7

The only difference from Example 1 was that the preparation step S3 of nutritional gummies containing liquid capsules was as follows: first, all the pouring syrup was added into molds, then the liquid capsules were added thereinto, and the product was cooled at 0° C., demoulded, and dried until having a water content of 16% to obtain nutritional gummies.

Comparative Example 1

The difference from Example 1 was that materials for preparing a wall material included: 6 g of gelatin, 10 of water, and 6 g of glycerol.

Comparative Example 2

The difference from Example 1 was that materials for preparing a wall material included: 6 g of starch acetate, 10 of water, and 6 g of glycerol.

Comparative Example 3

The difference from Example 1 was that materials for preparing a core material included: 12 g of vitamin C, 1 g of polyethylene glycol (having a molecular weight of 400), 0.4 g of beeswax, and 20 g of soybean oil.

Comparative Example 4

The difference from Example 1 was that materials for preparing a core material included: 12 g of vitamin C, 1 g of polyethylene glycol (having a molecular weight of 400), 0.4 g of phospholipid, and 20 g of soybean oil.

Comparative Example 5

The difference from Example 1 was that the preparation step S3 of nutritional gummies containing liquid capsules was as follows: first, the liquid capsules were added into molds, then all the pouring syrup was added thereinto, and the product was cooled at 0° C., demoulded, and dried until having a water content of 16% to obtain nutritional gummies.

Comparative Example 6

The difference from Example 1 was that liquid capsules in this comparative example were not added in the form of capsules, i.e., all components were directly mixed and then added to syrup, i.e., the preparation step S2 of nutritional gummies was as follows: 4 g of concentrated orange juice, 5 g of sodium hyaluronate, 0.2 g of orange flavor, 0.5 parts of a citric acid solution (50% by mass) and 0.2 g of a lactic acid solution (50% by mass) were added to initial syrup and mixed evenly, all components of the liquid capsules were directly added to the initial syrup after being mixed, so as to obtain pouring syrup, and the pouring syrup was kept warm for later use.

Comparative Example 7

The difference from Example 3 was that liquid capsules in this comparative example were not added in the form of capsules, i.e., all components were directly mixed and then added to syrup, i.e., the preparation step S2 of nutritional gummies was as follows: 4 g of concentrated orange juice, 5 g of sodium hyaluronate, 0.2 g of orange flavor, 0.5 parts of a citric acid solution (50% by mass) and 0.2 g of a lactic acid solution (50% by mass) were added to initial syrup and mixed evenly, all components of the liquid capsules were directly added to the initial syrup after being mixed, so as to obtain pouring syrup, and the pouring syrup was kept warm for later use.

Comparative Example 8

The difference from Example 4 was that liquid capsules in this comparative example were not added in the form of capsules, i.e., all components were directly mixed and then added to syrup, i.e., the preparation step S2 of nutritional gummies was as follows: 4 g of concentrated orange juice, 5 g of sodium hyaluronate, 0.2 g of orange flavor, 0.5 parts of a citric acid solution (50% by mass) and 0.2 g of a lactic acid solution (50% by mass) were added to initial syrup and mixed evenly, all components of the liquid capsules were directly added to the initial syrup after being mixed, so as to obtain pouring syrup, and the pouring syrup was kept warm for later use.

Performance of Liquid Capsules

Taking the liquid capsules of Examples 1, 5, 6 and Comparative Examples 1, 2 as samples, the following tests were carried out:

1) Strength and toughness of capsule shell: A physical property tester was employed, and a spherical probe and puncture mode were selected to test the force value (g) and corresponding rupture distance (mm) at a speed of 1.0 mm/s during rupture.

2) Molding seam adhesion: After a liquid capsule was cut off at a non-seam position, the contents in the liquid capsule were emptied, a ring was cut out from the middle perpendicular to a seam, the liquid capsule was then placed on a glass slide, with a seam being perpendicular to the glass slide, the thicknesses of the two seams and the thickness of a capsule shell were measured under a microscope, and a ratio P (%) of the thickness of the thinnest seam to the thickness of the capsule shell was calculated.

The evaluation criteria for the strength and toughness of capsule shell and the molding adhesion of liquid capsules are shown in Table 1 below.

TABLE 1

| Evaluation criteria | Weight | Score | | | | | |
|---|---|---|---|---|---|---|---|
| | | 5 points | 4 points | 3 points | 2 points | 1 point | 0 point |
| Strength (rupture force F) | 30% | F ≥ 200 g | 150 g ≤ F < 200 g | 100 g ≤ F < 150 g | 50 g ≤ F < 100 g | F < 50 g | Fail to shape |
| Toughness (rupture distance S) | 30% | S ≥ 10 mm | 8 mm ≤ S < 10 mm | 6 mm ≤ S < 8 mm | 4 mm ≤ S < 6 mm | S < 4 mm | Fail to shape |
| Molding seam adhesion | 40% | P ≥ 60% | 50% ≤ P < 60% | 40% ≤ P < 50% | 30% ≤ P < 40% | 0 ≤ P < 40% | Fail to shape by adhesion |

As shown in Table 1, the formability requirements of industrial production of liquid capsules can only be met when the strength, toughness, and molding seam adhesion of the capsules meet the following requirements at the same time:

① strength score≥3 points;

② toughness score≥3 points; and

③ molding seam adhesion score≥2 points.

The higher the score, the better the performance.

The comprehensive score for the strength, toughness, and molding seam adhesion of the capsules is calculated according to the following formula:

comprehensive score (X)=strength score×30%+
toughness score×30%+molding seam adhesion
score×40%

The higher the comprehensive score, the better the comprehensive performance of the liquid capsules. The results are as shown in Table 2 below.

TABLE 2

| Group | Strength score | Toughness score | Molding seam adhesion | Comprehensive score |
|---|---|---|---|---|
| Example 1 | 5 | 4 | 5 | 4.7 |
| Example 5 | 4 | 4 | 4 | 4.3 |
| Example 6 | 4 | 4 | 5 | 4.3 |
| Comparative Example 1 | 2 | 3 | 5 | 3.3 |
| Comparative Example 2 | 3 | 2 | 3 | 2.7 |

It is known that the greater the rupture force of capsule shell, the better the strength of the capsule shell; and the longer the rupture distance, the better the toughness of the capsule shell. The results show that the scores of the strength, toughness, and molding seam adhesion of the liquid capsules obtained in Comparative Examples 1 and 2, as well as their comprehensive scores are all lower than those in the examples. It can be seen that using gelatin and starch acetate for preparing the wall material in a specific proportion is beneficial to improvement of capsule processability.

Sensory Evaluation

A descriptive quantitative analysis method was used to conduct sensory evaluation on the nutritional gummies obtained in the examples and comparative examples. The experimental subjects were 20 evaluators with independent evaluation capabilities, half of them male and half female, forming a sensory evaluation team. Before participating in the evaluation, the evaluators all received professional training on food sensory related content, and had independent judgment ability on various sensory indicators; and the nutritional gummies were scored in terms of indicators including elasticity, color, chewiness, taste and smell, with a score range being 0-10. The higher the scores, the better the prepared nutritional gummies. The scoring results are as shown in Table 3.

TABLE 3

| Group | Color and shape score | Elasticity and chewiness score | Taste and smell score |
|---|---|---|---|
| Example 1 | 9 | 8 | 9 |
| Example 2 | 8 | 9 | 9 |
| Example 3 | 7 | 8 | 8 |
| Example 4 | 8 | 8 | 9 |
| Example 5 | 8 | 8 | 9 |
| Example 6 | 8 | 7 | 7 |
| Example 7 | 7 | 8 | 8 |
| Comparative Example 1 | 8 | 4 | 6 |
| Comparative Example 2 | 5 | 3 | 4 |
| Comparative Example 3 | 5 | 7 | 4 |
| Comparative Example 4 | | Product failure | |
| Comparative Example 5 | 4 | 6 | 7 |
| Comparative Example 6 | 6 | 5 | 6 |
| Comparative Example 7 | 5 | 3 | 3 |
| Comparative Example 8 | 5 | 4 | 5 |

The results show that the scores of at least one of the elasticity, color, chewiness, taste and smell of the nutritional gummies obtained in Comparative Examples 1-3 are lower than those of the examples. The nutritional gummies obtained in Comparative Example 4 cannot be formed, indicating that the composition and ratio of the wall materials and core materials affect the quality of the nutritional gummies in the liquid capsule preparation process; the overall scores of the nutritional gummies obtained in Comparative Example 5 are lower than those in Example 1, indicating that adding the pouring syrup first during the preparation of the nutritional gummies is conductive to improvement of the quality of the nutritional gummies; and the overall scores of the nutritional gummies obtained in Comparative Examples 6-8 are lower than those of the examples, indicating that the effective addition of the liquid capsules helps to improve the quality of the nutritional gummies.

Stability Performance

The nutritional gummies obtained in the examples and comparative examples were placed under the conditions of a temperature of 37° C. and a humidity of 75%. After accelerated inspection for 3 months, the nutritional gummies were tested. The results are as follows.

1. According to the high performance liquid chromatography of GB5009.86-2016, the vitamin C contents of the nutritional gummies obtained in Examples 1, 5-7 and Comparative Examples 1-6 after processing and after accelerated testing for 3 months were tested, and the retention rates were calculated according to the ratios of the vitamin C contents before the accelerated testing. The results are as shown in Table 4.

The results show that the nutritional gummies obtained in Comparative Examples 1-4 have a significantly higher decrease in vitamin C contents after 3 months of accelerated testing than those obtained in Examples 1, 5 and 6, indicating that the proportions of the components of the wall material and the core material in the liquid capsules affect the stability of the nutritional gummies; the decrease in vitamin C content in Comparative Example 5 is higher than that in Example 7, indicating that during the preparation of the nutritional gummies, adding the pouring syrup first helps the improvement of stability; and the decrease in vitamin C content in Example 6 is higher than that in Example 1, indicating that that adding the liquid capsules to the nutritional gummies can improve stability.

TABLE 4

| | Vitamin C retention rate (%) | |
|---|---|---|
| Group | After processing | Accelerated for 3 months |
| Example 1 | 95.2 | 85.4 |
| Example 5 | 92.8 | 83.5 |
| Example 6 | 93.1 | 84.6 |
| Example 7 | 93.7 | 84.3 |
| Comparative Example 1 | 80.4 | 50.4 |
| Comparative Example 2 | 78.2 | 47.5 |
| Comparative Example 3 | 88.2 | 66.8 |
| Comparative Example 4 | Vitamin C and dispersant present oil-powder separation, indicating a failure in effective addition | |
| Comparative Example 5 | 90.8 | 75.5 |
| Comparative Example 6 | 66.7 | 28.6 |

2. According to GB5009.86-2016, the retention rates of DHA contents in the nutritional gummies obtained in Example 3 and Comparative Example 7 after processing and after accelerated testing for 3 months were determined. Referring to GB 5009.227-2016, the peroxide values of the nutritional gummies after processing and after accelerated testing for 3 months were determined. The sensory quality of the nutritional gummies obtained in Example 3 and Comparative Example 7 after processing and after accelerated testing for 3 months was evaluated based on whether there was any fishy smell. The results are as shown in Table 5.

The results show that the nutritional gummies obtained in Comparative Example 7 have a significantly higher decrease in DHA content after 3 months of accelerated testing than those obtained in Example 3, and the change thereof in peroxide value is higher than that of Example 3, with a strong fishy smell appearing. It can be seen that adding the liquid capsules to the gummies can improve the stability of the gummies and perfect the flavor of the product.

prepared into sample homogenate. Based on the estimation of the B. coagulans in the samples to be tested, 2-3 consecutive appropriate dilutions were selected. The culture medium that had been melted and cooled to about 45° C. was poured into a culture dish, and the culture dish was carefully rotated to thoroughly mix the samples well. After solidification, the culture medium was placed upside down into an incubator at 42° C.±1° C. for incubating for 48 h. A plate with a colony count of 30-300 CFU and no spreading colony growth was selected, and the total number of colonies was counted.

The probiotic-*B. coagulans* contents of the nutritional gummies obtained in Example 4 and Comparative Example 8 during processing and after accelerated testing for 3

TABLE 5

| | | DHA content (%) | | Peroxide value (POV) (%) | | Fishy smell | |
|---|---|---|---|---|---|---|---|
| Group | Initial | After processing | Accelerated for 3 months | After processing | Accelerated for 3 months | After processing | Accelerated for 3 months |
| Example 3 | 3 | 2.94 | 2.7 | Not detected | Not detected | — | * |
| Comparative Example 7 | 3 | 2.7 | 2.1 | Not detected | 0.097 | ** | *** |

Note:
— represents no fishy smell;
* represents a faint fishy smell;
** represents a less strong fishy smell; and
*** represents a strong fishy smell.

Note:—represents no fishy smell; *represents a faint fishy smell; represents a less strong fishy smell; and *represents a strong fishy smell.

3. Taking the nutritional gummies obtained in Example 4 and Comparative Example 8 as samples, 25 g of each of the samples was weighed and placed in a 250 ml conical flask containing 225 mL of a dispersant, glass beads were added thereinto, the obtained mixture was homogenized on a thermostatic oscillator (at 20° C., and a speed of 250 rpm) for 30 min, and the conical flask was immersed in a water bath at 80° C. for 10 min. The conical flasks were shaken during the water bath to ensure that bacterial suspensions were heated evenly.

5.0 g of glucose, 5.0 g of yeast powder, 10.0 g of peptone, 5.0 g of beef paste, 250 mg of sodium chloride, 150 mg of calcium chloride, 100 mg of manganese sulfate monohydrate, 500 mg of L-cysteine monohydrochloride, and 15.0 g of agar powder were mixed together, the pH of the mixture was adjusted to a most suitable pH for the growth of *Bacillus coagulans* in the raw materials, and the volume was set to the scale of 1000 mL to prepare a culture medium.

The bacterial suspensions treated with the water bath were taken out, quickly cooled to the room temperature, and months were detected, and the results are as shown in Table 6 below. The results show that in the period from completion of the processing of the nutritional gummies obtained in Comparative Example 8 to the 1 to 3 months of accelerated testing, the probiotic-*B. coagulans* content was significantly lower than that of Example 3, indicating that adding the liquid capsules to the gummies can improve the stability of the gummies.

TABLE 6

| | Target | Probiotic-*B. coagulans* content | | | |
|---|---|---|---|---|---|
| Group | addition amount | Accelerated for 1 month | Accelerated for 2 months | Accelerated for 3 months | Accelerated for 4 months |
| Example 4 | $10^9$ CFU/g | $0.95 \times 10^9$ CFU/g | $0.88 \times 10^9$ CFU/g | $0.82 \times 10^9$ CFU/g | $0.76 \times 10^9$ CFU/g |
| Comparative Example 8 | $10^9$ CFU/g | $0.65 \times 10^9$ CFU/g | $0.52 \times 10^9$ CFU/g | $0.40 \times 10^9$ CFU/g | $0.18 \times 10^9$ CFU/g |

The foregoing description of the examples is provided to facilitate the understanding and use of the present disclosure by those of ordinary skill in the art. It will be apparent to those skilled in the art that various modifications may be readily made to these examples and that the general principles described herein may be applied to other examples without the need for inventive effort. Therefore, the present disclosure is not limited to the above examples, and any improvements and modifications made by those skilled in the art based on the present disclosure without departing from the scope of the present disclosure shall fall within the protection scope of the present disclosure.

What is claimed is:

1. A preparation method for high-loading liquid capsules for nutritional gummies, comprising the following steps:
   step (1), mixing hydrocolloid, a solvent, and colorant for dissolving, performing vacuum treatment, and standing still to obtain a wall material;
   step (2), dispersing a functional substance and an additive in a dispersant to obtain a core material; and
   step (3), processing the wall material obtained in step (1) into capsule shell, encapsulating the core material obtained in step (2) in the capsule shell, and drying to obtain the high-loading liquid capsules;
   in step (1), the hydrocolloid is a mixture of gelatin and starch acetate, with a mixed mass ratio being (2-3): 1;
   in step (2), the additive is a mixture of polyethylene glycol, beeswax, and phospholipid, with a mixed mass ratio being 1:(0.2-0.35):(0.1-0.25);
   the high-loading liquid capsules are prepared from the following components in parts by weight:
   materials for preparing a package material: 30-68 parts of hydrocolloid and 60-100 parts of a solvent;
   materials for preparing a core material: 120-150 parts of a functional substance, 10-20 parts of an additive, and 100-200 parts of a dispersant;
   in step (3), the mass ratio of the wall material to the core material is (15-52):(48-85); and
   in step (1), the dissolving is carried out at the temperature of 60-105° C., the vacuum treatment is performed at the temperature of 60-105° C. under the pressure of –0.6 to –0.9 MPa, and the standing is performed at a temperature of 50-100° C. for 1-2 h.

2. Nutritional gummies containing high-loading liquid capsules, the high-loading liquid capsule prepared by the preparation method according to claim 1, and a gummies material and a blended solution,
   wherein a wall material of the liquid capsule comprises a hydrocolloid, a solvent and colorant, a core material of the liquid capsule comprises a functional substance, an additive and a dispersant; the hydrocolloid is a mixture of gelatin and starch acetate, with a mixed mass ratio being (2-3):1;
   a wall material of the high-loading liquid capsules is prepared from the following components in parts by weight: 30-68 parts of hydrocolloid, 0-0.5 parts of colorant and 60-100 parts of a solvent, and a core material of the liquid capsules is prepared from the following components in parts by weight: 120-150 parts of a functional substance, 10-20 parts of an additive and 100-200 parts of a dispersant, wherein
   the solvent is water, glycerol, and a mixture thereof;
   the additive is a substance that helps the core material to be uniformly and stably dispersed, the additive is a mixture of polyethylene glycol, beeswax and phospholipid, with a mixed mass ratio being 1:(0.2-0.35):(0.1-0.25);
   the dispersant is a substance that disperses the core material;
   the functional substance is any one or a mixture of several selected from the group consisting of fat-soluble vitamins, water-soluble vitamins, carotenoids, minerals, sodium hyaluronate, probiotic powder, natural product extracts, algae oil, fish oil, natural oil, and DHA;
   the gummies material is any one or a mixture of several selected from the group consisting of sugar, edible glucose, maltitol, maltitol syrup, sorbitol syrup, erythritol, isomaltitol, maltose syrup, cassava syrup, starch acetate, gelatin, pectin, carrageenan, arabic gum, gellan gum, oligofructose, polyglucose, agar, sodium alginate, fruit and vegetable juice, and functional substances; and
   the blended solution comprises fruit juice, flavor, colorant, an acidity regulator, and functional substances.

3. The nutritional gummies containing the high-loading liquid capsules according to claim 2, wherein the mass ratio of the gummies material, the high-loading liquid capsules and the blended solution is 100:(5-47):(0-25).

4. The nutritional gummies containing the high-loading liquid capsules according to claim 3, wherein the nutritional gummies containing the high-loading liquid capsules are prepared from the following components in parts by weight: 5-30 parts of the high-loading liquid capsules, 30-50 parts of maltose syrup, 25-35 parts of sugar, 2-5 parts of sorbitol syrup, 5-10 parts of gelatin, 0.5-5 parts of starch acetate, 0.1-0.5 parts of pectin, 0.2-0.5 parts of agar, and 0-25 parts of the blended solution.

5. The nutritional gummies containing the high-loading liquid capsules according to claim 3, wherein the nutritional gummies containing the high-loading liquid capsules are prepared from the following components in parts by weight: 5-30 parts of the high-loading liquid capsules, 50-70 parts of maltitol syrup, 7-15 parts of maltitol, 5-10 parts of gelatin, 0.5-5 parts of starch acetate, 0.1-0.5 parts of pectin, 0.2-0.5 parts of agar, and 0-25 parts of the blended solution.

6. A preparation method for nutritional gummies containing high-loading liquid capsules according to claim 2, comprising the following steps:
   S1. dissolving a gummies material in water, and boiling until the solid concentration is 60-85%, so as to obtain initial syrup;
   S2. mixing the initial syrup obtained in S1 with a blended solution to obtain pouring syrup, and keeping same warm for later use; and
   S3. adding the pouring syrup obtained in S2 and the high-loading liquid capsules into molds for molding to obtain the nutritional gummies, obtain the nutritional gummies containing high-loading liquid capsules.

7. The preparation method for the nutritional gummies containing the high-loading liquid capsules according to claim 6, wherein in S3, adding the pouring syrup and the high-loading liquid capsules into the molds comprises: first adding 10-30% by mass of the total pouring syrup into the molds, then injecting the liquid capsules thereinto, and finally adding the remaining pouring syrup.

* * * * *